Figure 1:
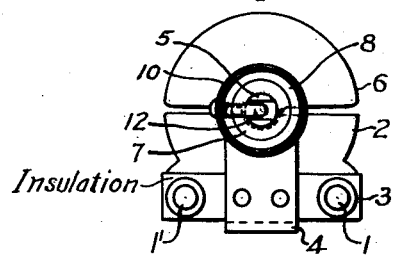

Dec. 5, 1939. J. L. SEIBERT 2,182,645
COMPENSATED CONDENSER
Filed Sept. 10, 1937

WITNESSES:

INVENTOR
John L. Seibert.
BY
ATTORNEY

Patented Dec. 5, 1939

2,182,645

UNITED STATES PATENT OFFICE 2,182,645

COMPENSATED CONDENSER

John L. Seibert, Cranford, N. J., assignor to Westinghouse Electric & Manufacturing Company, East Pittsburgh, Pa., a corporation of Pennsylvania Application September 10, 1937, Serial No. 163,198

2 Claims. (Cl. 175—41.5)

This invention relates to electrical condensers of the variable type, and more particularly to condensers wherein capacity changes due to temperature variations may automatically be compensated.

The primary object of this invention is the provision of means for automatically effecting corrective changes in the capacity of a variable condenser upon variations in temperature of the medium surrounding the condenser and affecting its capacity.

A feature of this invention resides in the novel application of the mechanical stresses inherent in bimetallic alloys or pressed elements upon changes of temperature to impart rotary motion to a variable condenser of conventional design.

Condensers of the variable air dielectric type find extensive application in the electrical, and especially the radio art and the need for one which maintains its capacity substantially constant upon changes in ambient temperature is especially manifest in oscillatory circuits wherein small changes are apt to disbalance critical settings of electrical constants. Attempts have been made to produce condensers from alloys having low temperature coefficients, or to associate bimetallic elements in the form of condenser plates or auxiliary plates, with a condenser and thereby correct adverse effects of temperature variations. In the latter schemes, the bimetallic element afforded but very small corrections due to the restricted motion thereof which necessarily was limited by the structure in which the bimetallic element acted as a means to distort the normal configuration thereof in opposition to such distortions which temperature changes would otherwise cause.

It is a particular feature of the present invention that the variable condenser constructed in accordance therewith can be of conventional design and its capacity may be varied automatically in accordance with temperature variations in substantially the same manner as its normal manual variation and in any desired ratio or direction up to the full extent of its capacity range. Furthermore, the temperature responsive compensating means embodied in this invention comprises a thermal device of a compact and flexible structure which may easily be attached to practically any variable condenser having a rotor element and a stator element, and rotatably actuate the former upon change of temperature to which it is exposed.

In oscillatory circuits of transmitters, the operating currents may sufficiently heat the frequency determining circuit of which the condenser forms an integral part, and thereby cause an appreciable frequency shift. By suitable design the actuating thermal element of the condenser, in accordance with this invention, can be subjected to the generated temperature and effect the required capacity correction of the condenser in order to maintain the frequency of the oscillatory circuit constant.

Figure 2:
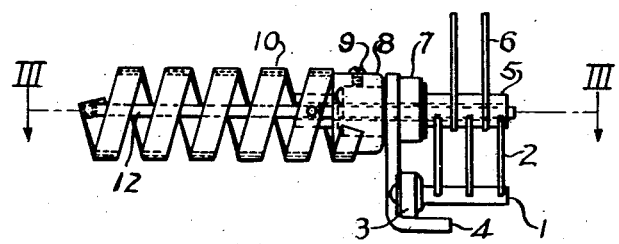
Figure 3:
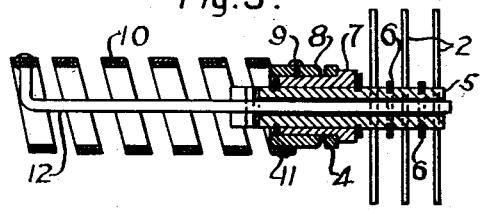

Other objects and advantages will be apparent from the following description of the invention, defined in particularity by the appended claims, and taken in connection with the accompanying drawing, in which:

Figure 1 is a front elevational view of a temperature variable condenser in accordance with this invention, Fig. 2 is a side elevational view of the above, and Fig. 3 is a section taken along the lines III—III of Fig. 2.

Referring to Figure 1, the condenser comprises the metallic stationary members 1 and 1' in which are embedded the stator plates 2. This assembly is supported by a cross member 3 of insulating material to which is fastened a supporting bracket 4. The latter terminating upward is provided with a suitable aperture to hold a bearing in which the spindle 5 of the rotor plates 6 revolves. This can better be seen in Fig. 2, where the bearing 7, in the form of a bushing, is shown supported by the bracket 4. The spindle 5 carries the rotor plates 6 which are so spaced as to interleave with the stator plates 2.

The above description illustrates a particular form of a conventional variable condenser merely by way of example. It will be clear from the description as it continues that no restriction need be placed upon the particular construction shown in order to obtain the objects and advantages attained by the present invention. It is applicable to any variable condenser as well as to the particular one shown. Continuing with Fig. 2, a rotatable collar 8 is placed upon the outer surface of the bearing 7 and may be fastened thereto in any desired position of angular displacement by means of a set screw 9. Attached to the collar 8 and extending coaxially with the spindle 5 is a helically wound strip 10 made of suitable bimetals, or alloys, for instance as disclosed in United States Patents 1,993,020 or 1,987,714, having different temperature expansivities. By virtue of the helical structure, the expansion or contraction of the element 10, is translated into rotary motion. This can best be observed in the sectional view of Fig. 3. The bimetallic helix 10 is secured at one end to the collar 8 by means of the rivet 11 and at the other end to the extended portion 12 of the spindle 5, in any suitable way, for instance as shown protruding through an aperture in the strip. As long as the set screw 9 is tightened down, the collar 8 is firmly attached to the bearing 7 and thereby the strip 10 is rigidly held in position. Temperature variations resulting in mechanical stresses of the strip initiate a torsional movement thereof which creates a force between the two extremities of the strip 10. The force is applied between the stationary collar 8 and the rotatable shaft 12, hence the condenser rotor is displaced in proportion with the expansive force of the bimetallic helix.

The manual setting of the condenser may be effected by the loosening of the set screw 9 which allows free motion of the collar 8. The rotation thereof applies a force through the helix onto the extended portion 12 of the spindle 5 and thereby the rotor may be positioned in any desired manner. If thermostatic actuation is desired the set screw 9 is tightened and the thermal element is again actively coupled to the condenser.

I claim as my invention:

1. In an electrical condenser, the combination of a pair of members, one of which is rotatable relative to the other, said members being provided with interleaved plates, a support for the rotatable member comprising a spindle journaled in a bearing, said spindle having an extended portion of smaller diameter, a framework supporting the stationary member and said bearing, a bimetallic strip wound in the form of a helix, one end thereof being secured to a collar upon said bearing and the other end to said extended portion.

2. In an electrical condenser, the combination of a pair of members, one of which is rotatable relative to the other, said members being provided with interleaved plates, a support for the rotatable members comprising a spindle journaled in a bearing, said spindle having an extended portion of smaller diameter, a framework supporting the stationary members and said bearing, a bimetallic strip wound in the form of a helix having one end secured to a collar upon said bearing and the other end to said extended portion, said collar being rotatably arranged upon the outer surface of said bearing and fixed thereon in any desired position by means of a set screw, whereby said rotatable members may be initially positioned with respect to said stationary members.

JOHN L. SEIBERT.